(12) United States Patent
Breen et al.

(10) Patent No.: US 12,366,123 B2
(45) Date of Patent: Jul. 22, 2025

(54) WEDGE THREAD CONNECTION FOR TUBULAR GOODS

(71) Applicant: Hydril Company, Houston, TX (US)

(72) Inventors: Jonathan Robert Breen, Houston, TX (US); David Mutis Rueda, Houston, TX (US); Andrew Henry Tate, Houston, TX (US)

(73) Assignee: HYDRIL COMPANY, Houston, TX (US)

( * ) Notice: Subject to any disclaimer, the term of this patent is extended or adjusted under 35 U.S.C. 154(b) by 0 days.

(21) Appl. No.: 18/058,993

(22) Filed: Nov. 28, 2022

(65) Prior Publication Data

US 2023/0088330 A1    Mar. 23, 2023

Related U.S. Application Data

(63) Continuation of application No. 16/394,448, filed on Apr. 25, 2019, now Pat. No. 11,512,538.

(60) Provisional application No. 62/662,612, filed on Apr. 25, 2018.

(30) Foreign Application Priority Data

Jul. 27, 2018 (NL) .................................. N2021407

(51) Int. Cl.
*F16L 15/00* (2006.01)
*E21B 17/042* (2006.01)
*E21B 17/08* (2006.01)

(52) U.S. Cl.
CPC ............ *E21B 17/042* (2013.01); *E21B 17/08* (2013.01); *F16L 15/004* (2013.01)

(58) Field of Classification Search
CPC ....... F16L 15/00; F16L 15/001; F16L 15/002; F16L 15/006; F16L 15/007; F16L 15/06; F16L 15/08; E21B 17/042; E21B 17/08
See application file for complete search history.

(56) References Cited

U.S. PATENT DOCUMENTS

| | | | | |
|---|---|---|---|---|
| 5,137,310 A | * | 8/1992 | Noel | E21B 17/042 285/333 |
| 5,931,511 A | * | 8/1999 | DeLange | F16L 15/003 285/333 |
| 6,155,613 A | * | 12/2000 | Quadflieg | F16L 15/001 285/334 |
| 11,512,530 B2 | * | 11/2022 | Lu | E06B 9/50 |

(Continued)

*Primary Examiner* — Aaron M Dunwoody
(74) *Attorney, Agent, or Firm* — Morgan, Lewis & Bockius LLP

(57) ABSTRACT

A tubular connection includes a first joint of casing having an integral box end with an internal female wedge threaded zone having wedge threads disposed on a portion of the integral box end, and a second joint of casing having an integral pin end with an external male wedge threaded zone having wedge threads disposed on a portion of the integral pin end. The external male wedge threads engage with the internal female wedge threads. The second joint of casing has an internal diameter D1, and also includes an internal annular recess with an internal diameter D2. D2 is greater than D1, and the annular recess is disposed longitudinally along an inner surface of the second joint of casing. The annular recess is positioned radially adjacent to a portion of the external male threads disposed on a lower portion of the pin end.

20 Claims, 6 Drawing Sheets

(56) References Cited

U.S. PATENT DOCUMENTS

2016/0160575 A1\* 6/2016 Hou ..................... F16L 15/002
　　　　　　　　　　　　　　　　　　　　　285/334

\* cited by examiner

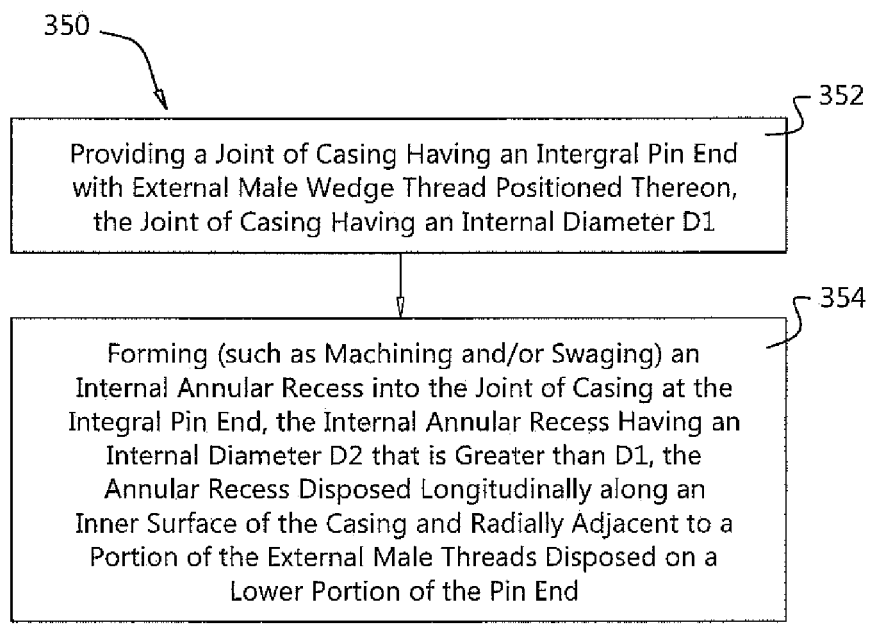
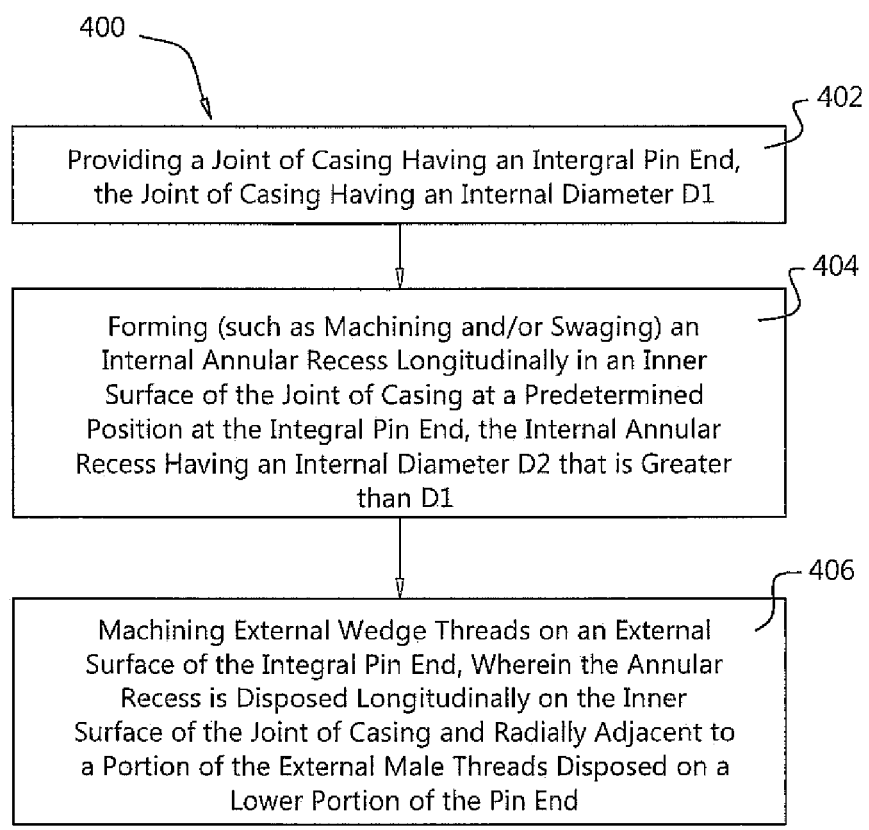

WEDGE THREAD CONNECTION FOR TUBULAR GOODS

CROSS REFERENCE TO RELATED APPLICATIONS

This application is a continuation of U.S. Ser. No. 16/394,448, filed Apr. 25, 2019, which claims the benefit of priority to U.S. Provisional Application 62/662,612, filed Apr. 25, 2018, and Dutch Patent Application No. N2021407, filed, Jul. 27, 2018, the contents of which are incorporated by reference herein.

TECHNICAL FIELD

This disclosure relates to a wedge thread connection for tubular goods, in particular, threaded tubular wedge connections for tubular goods used in a wellbore.

BACKGROUND

Threaded wedge connections are used to couple joints of casing together for use in a wellbore. A made-up tubular goods connection couples a first (lower) tubular member with a box end having an internal wedge thread therein and a second (upper) tubular member with a pin end having an external wedge thread thereon.

SUMMARY

This disclosure describes threaded wedge connections for tubular goods used in wellbores.

Certain aspects of the disclosure include a tubular connection including a first joint of casing and a second joint of casing. The first joint of casing includes an integral box end with an internal female wedge threaded zone having internal female wedge threads disposed on a box portion of the integral box end, and the second joint of casing includes an integral pin end with an external male wedge threaded zone having external male wedge threads disposed on a pin portion of the integral pin end. The external male wedge threads are configured to engage with the internal female wedge threads. The second joint of casing has an internal diameter D1, the second joint of casing further includes an internal annular recess having an internal diameter D2, and D2 is greater than D1. The internal annular recess is disposed longitudinally along an inner surface of the second joint of casing and radially adjacent to a portion of the external male wedge threads disposed on a lower portion of the integral pin end.

This, and other aspects, can include one or more of the following features. The internal annular recess can be disposed radially adjacent to the portion of the external male wedge threads disposed on the lower portion of the integral pin end. At least part of the internal annular recess can be disposed radially adjacent to the portion of the external male wedge threads disposed on the lower portion of the integral pin end. Only part of the internal annular recess can be disposed radially adjacent to the portion of the external male wedge threads disposed on the lower portion of the integral pin end. The second joint of casing can comprise a central longitudinal axis. A first virtual plane extending perpendicular to the central longitudinal axis of the second joint of casing and through the part of the internal annular recess being disposed radially adjacent to the portion of the external male wedge threads disposed on the lower portion of the integral pin end can extend also through said portion of the external male wedge threads. The internal annular recess can comprise a longitudinal length L1. The longitudinal length of the internal annular recess L1 can be less than a longitudinal length of a tool joint L3 on a drill string selectively disposed within the second joint of casing. The longitudinal length of the internal annular recess L1 can be less than a longitudinal length of a coupling L4 on a threaded and coupled tubing string selectively disposed within the second joint of casing. The internal annular recess can be disposed radially adjacent to, but not in contact with, a metal-to-metal sealing surface of the integral pin end. A second virtual plane extending perpendicular to the central longitudinal axis of the second joint of casing and through the part of the internal annular recess being disposed radially adjacent to the metal-to-metal sealing surface of the integral pin end can extend also through said metal-to-metal sealing surface. The internal annular recess preferably extends to the terminal end of the integral pin end. The internal annular recess can be disposed across from, or radially adjacent to, a longitudinal end portion of the external male wedge threads. A longitudinal length of the internal annular recess can be less than a longitudinal length of the external male wedge threaded zone L5. The longitudinal length of the internal annular recess can be about half of the longitudinal length of the external male wedge threaded zone. The internal annular recess can be adapted to provide flexibility to a lower portion of the integral pin end of the second joint of casing. The internal annular recess can be adapted to provide flexibility required for sealing a metal-to-metal seal disposed between a lower most thread of the external male wedge threads and a terminal end of the integral pin end. In a preferred embodiment including the latter feature, the metal-to-metal sealing surface is a primary sealing zone of the tubular connection, and the portion of external male wedge threads radially adjacent to the recess includes a sealing portion of the threads, the sealing portion of the threads forming a secondary sealing zone of the tubular connection, wherein the annular recess is disposed radially adjacent to the metal-to-metal sealing surface of the integral pin end and radially adjacent to a longitudinal end portion of the external male wedge threads so as to provide flexibility required for sealing a lower end portion of the wedge threads together to form the secondary seal, while also providing flexibility to the primary metal-to-metal sealing surface.

This, and other aspects, can include one or more of the following features. The second joint of casing can include an internal transition section disposed inside (e.g. at the inner surface) of the second joint of casing at an upper longitudinal end of the internal annular recess, the internal transition section is configured to transition the internal diameter D2 of the internal annular recess to the internal diameter D1 of the second joint of casing. The internal transition section can include a conical shape. The internal transition section can include a non-linear profile between the internal diameter D1 of the second joint of casing and the internal diameter D2 of the internal annular recess. The external male wedge threads of the integral pin end and the internal female wedge threads of the integral box end can be made-up into each other and the integral pin end and the integral box end can be positioned at a final make-up position relative to each other. The first joint of casing can comprise an internal ledge and a longitudinal length L2 of a recessed zone extending from the internal transition section to the internal ledge can be less than a longitudinal length of a tool joint L3 on a drill string selectively disposed within the second joint of casing. The first joint of casing can comprise an internal ledge and a longitudinal length L2 of a recessed zone extending from the internal transition section to the internal ledge can be less than a longitudinal length of a coupling L4 on a threaded and coupled tubing string selectively disposed within the second joint of casing. The internal ledge can comprise a terminal surface disposed substantially axially with respect to the central longitudinal axis. The internal ledge can comprise a terminal surface extending substantially radially with respect to the central longitudinal axis. The internal ledge can comprise a terminal surface extending substantially perpendicular with respect to the central longitudinal axis. The internal diameter D2 of the internal annular recess can be the same along the entire longitudinal length of the internal annular recess. The internal diameter D2 of the internal annular recess can gradually increase from a first longitudinal end of the internal annular recess to a second, opposite longitudinal end of the internal annular recess. The internal diameter D2 of the internal annular recess can gradually decrease from a first longitudinal end of the internal annular recess to a second, opposite longitudinal end of the internal annular recess.

In a particular preferred embodiment of the tubular connection of this disclosure a metal-to-metal sealing surface is disposed between the lower most thread and the terminal end of the integral pin end for forming a seal. Preferably the internal annular recess is disposed longitudinally along the inner surface of the second joint of casing and radially adjacent to the portion of the external male wedge threads disposed on the lower portion of the integral pin end so as to provide flexibility in the lower portion of the integral pin end to improve the seal provided by the metal-to-metal sealing surface. The internal annular recess may also be radially adjacent the metal-to-metal sealing surface. Alternatively, or additionally the external male wedge thread is configured to sealingly engage with the internal female wedge thread, and wherein preferably the internal annular recess is disposed longitudinally along an inner surface of the second joint of casing and radially adjacent to the portion of the external male wedge threads disposed on the lower portion of the integral pin end so as to provide flexibility in the lower portion of the integral pin end required to sealingly engage a lower end portion of the wedge threads. In an embodiment the metal-to-metal sealing surface is disposed between the lower most thread and the terminal end of the integral pin end for forming a primary seal and the external male wedge thread is configured to sealingly engage with the internal female wedge thread to form the secondary seal. In such embodiment, preferably the internal annular recess is disposed longitudinally along the inner surface of the second joint of casing and radially adjacent to the portion of the external male wedge threads disposed on the lower portion of the integral pin end so as to provide flexibility in the lower portion of the integral pin end required for sealing the lower end portion of the wedge threads together to form the secondary seal, while also providing flexibility in the lower portion of the integral pin end to improve the primary seal provided by the primary metal-to-metal sealing surface. The internal annular recess may also be radially adjacent the metal-to-metal sealing surface. Advantageously in these preferred embodiments the internal annular recess is not disposed longitudinally along an inner surface of the second joint of casing radially adjacent to the portion of the external male wedge threads disposed on the upper portion of the integral pin end. This allows for maintaining mechanical strength in the upper portion of the integral pin end on which the portion of the external male wedge threads is disposed, while providing flexibility in the lower portion of the integral pin end.

Preferably in the tubular connection of this disclosure, and also in the above described preferred embodiment, the threads have a dovetail wedge thread profile. This particular feature allows to make most advantages use of the flexibility provided by the internal annular recess to enhance sealing at the metal-to-metal sealing surface and/or enhance sealing of the wedge thread in the lower portion of the wedge thread connection.

Preferably in the tubular connection of this disclosure, and also in the above described preferred embodiment, the tubular connection is configured for indeterminate make-up. In other words, preferably the tubular connection does not have a torque shoulder. In a preferred embodiment the first joint of casing comprises an internal ledge facing the terminal end of the integral pin end of the second joint of casing at a final make-up position of the first joint of casing and the second joint of casing relative to each other, wherein at the final make-up position the terminal end of the integral pin end of the second joint is not in contact with the internal ledge. As a result of the terminal end of the integral pin end of the second joint not being in contact with the internal ledge at the final make-up position, the integral pin end acts as a cantilever. The internal annular recess increases flexibility along the portion of the integral pin end, i.e. along the portion of the cantilever, where the internal annular recess is radially adjacent. In particular in combination with the threads having a dovetail wedge thread profile, the dovetail wedge thread profile may support the cantilever along its length and may advantageously pull the portion of the integral pin end with increased flexibility outwards to enhance sealing at the above referenced metal-to-metal sealing surface and/or to enhance sealing of the wedge thread in the lower portion of the wedge thread connection. In the preferred embodiment with the internal ledge, the internal ledge may form an inset in the inner diameter D7 of the first joint of casing, wherein preferably the internal diameter D2 of the internal annular recess is greater than the inner diameter D7 of the first joint of casing. Thus the internal ledge contributes to preventing egress of a well tool joint into the recess. In a further preferred embodiment the second joint of casing comprises an internal transition section disposed inside of the second joint of casing at an upper longitudinal end of the internal annular recess and a recessed zone extends from the transition section to the ledge when the first joint of casing is in sealing engagement with the second joint of casing. The recessed zone may have a longitudinal length L2 that is less than a longitudinal length of a tool joint L3 on a drill string selectively disposed within the second joint of casing. Alternatively or additionally, the recessed zone may have a longitudinal length L2 that is less than a longitudinal length of a coupling L4 on a threaded and coupled tubing string selectively disposed within the second joint of casing.

Certain aspects of the disclosure encompass a method for forming a wedge connection. The method includes providing a joint of casing having an integral pin end with an external male wedge threaded zone having external male wedge threads positioned thereon, the joint of casing having an internal diameter D1, and forming an internal annular recess into the joint of casing at the integral pin end, the internal annular recess having an internal diameter D2 that is greater than D1. The internal annular recess is disposed longitudinally along an inner surface of the joint of casing and radially adjacent to a portion of the external male wedge threads disposed on a lower portion of the integral pin end. The forming of the internal annular recess may comprise machining the internal annular recess into the joint of casing at the integral pin end. The forming of the internal annular recess may comprise swaging the internal annular recess into the joint of casing at the integral pin end. The forming of the internal annular recess may comprise machining and swaging the internal annular recess into the joint of casing at the integral pin end.

This, and other aspects, can include one or more of the following features. Forming (such as machining and/or swaging) the internal annular recess into the joint of casing can include forming (such as machining and/or swaging) the internal annular recess a longitudinal length that is less than a longitudinal length of the external male wedge threaded zone. Forming (such as machining and/or swaging) the internal annular recess can include choosing a longitudinal length of the internal annular recess based at least in part on a longitudinal length of a tool joint configured to be disposed inside the joint of casing disposed in a wellbore, the longitudinal length of the internal annular recess to be less than the longitudinal length of the tool joint. Machining the internal annular recess into the joint of casing can include machining the internal annular recess with a lathe. The joint of casing with the integral pin end can be a second joint of casing, and the method can include providing a first joint of casing having an integral box end with an internal female wedge threaded zone having internal female wedge threads configured to engage the external male wedge threads disposed on the integral pin end of the second joint of casing.

Certain aspects of the disclosure encompass a method for forming a wedge connection. The method includes providing a joint of casing having an integral pin end, the joint of casing having an internal diameter D1, forming an internal annular recess longitudinally in an inner surface of the joint of casing at a predetermined position at the integral pin end, the internal annular recess having an internal diameter D2 that is greater than D1, and machining external wedge threads on an external surface of the integral pin end. The internal annular recess is disposed longitudinally on the inner surface of the joint of casing and radially adjacent to a portion of the external male wedge threads disposed on a lower portion of the integral pin end. The forming of the internal annular recess may comprise machining the internal annular recess longitudinally in the inner surface of the joint of casing at the predetermined position at the integral pin end. The forming of the internal annular recess may comprise swaging the internal annular recess longitudinally in the inner surface of the joint of casing at the predetermined position at the integral pin end. The forming of the internal annular recess may comprise machining and swaging the internal annular recess longitudinally in the inner surface of the joint of casing at the predetermined position at the integral pin end.

This, and other aspects, can include one or more of the following features. Forming (such as machining and/or swaging) the internal annular recess into the joint of casing can include forming (such as machining and/or swaging) the internal annular recess a longitudinal length that is less than a longitudinal length of the external male wedge threaded zone. Forming (such as machining and/or swaging) the internal annular recess can include choosing a longitudinal length of the internal annular recess based at least in part on a longitudinal length of a tool joint configured to be disposed inside the joint of casing disposed in a wellbore, the longitudinal length of the internal annular recess to be less than the longitudinal length of the tool joint. Additionally or alternatively, a metal-to-metal sealing surface is disposed between the lower most thread and the terminal end of the integral pin end for forming a seal, and forming the internal annular recess comprises choosing a longitudinal length of the internal annular recess so as to provide flexibility in the lower portion of the integral pin end to improve the seal provided by the metal-to-metal sealing surface. Additionally or alternatively, forming the internal annular recess may comprise choosing a longitudinal length of the internal annular recess so as to provide flexibility required to enhance sealing of the external male wedge threads in the a lower portion of the integral pin end. Forming the internal annular recess may further comprise choosing a longitudinal length of the internal annular recess such that the internal annular recess is not disposed longitudinally along an inner surface of the second joint of casing radially adjacent to the portion of the external male wedge threads disposed on the upper portion of the integral pin end so as to maintain mechanical strength in the upper portion of the integral pin end on which the portion of the external male wedge threads is disposed. Machining the internal annular recess into the joint of casing can include machining the internal annular recess with a lathe. The joint of casing with the integral pin end can be a second joint of casing, and the method can include providing a second joint of casing having an integral box end with an internal female wedge threaded zone having internal female wedge threads configured to engage the external male wedge threads disposed on the integral pin end of the second joint of casing.

Certain aspects of the disclosure encompass a kit of parts comprising the tubular connection of this disclosure, and a drill string, wherein a longitudinal length of the internal annular recess L1 is less than a longitudinal length of a tool joint L3 on the drill string. The first joint of casing may comprise an internal ledge and a longitudinal length L2 of a recessed zone extending from an internal transition section of the internal annular recess to the internal ledge is less than the longitudinal length of the tool joint L3 on the drill string. The external male wedge threads of the integral pin end and the internal female wedge threads of the integral box end may be made-up into each other and the integral pin end and the integral box end may be positioned at a final make-up position relative to each other.

Certain aspects of the disclosure encompass a kit of parts comprising the tubular connection of any one of the claims 1 to 17, and a coupled tubing string, wherein a longitudinal length of the internal annular recess L1 is less than a longitudinal length of a coupling L4 on the threaded and coupled tubing string. The first joint of casing may comprise an internal ledge and a longitudinal length L2 of a recessed zone extending from an internal transition section of the internal annular recess to the internal ledge is less than the longitudinal length of the coupling L4 on the threaded and coupled tubing string. The external male wedge threads of the integral pin end and the internal female wedge threads of the integral box end may be made-up into each other and the integral pin end and the integral box end may be positioned at a final make-up position relative to each other.

Certain aspects of the disclosure encompass a method for forming a wedge connection. The method includes providing a joint of casing having an integral pin end, the joint of casing having an internal diameter D1, machining an internal annular recess longitudinally in an inner surface of the joint of casing at a predetermined position at the integral pin end, the internal annular recess having an internal diameter D2 that is greater than D1, and machining external wedge threads on an external surface of the integral pin end. The annular recess is disposed longitudinally on the inner surface of the joint of casing and radially adjacent to a portion of the external male threads disposed on a lower portion of the pin end. Alternatively, instead of machining the internal annular recess, the annular recess may be formed by swaging.

This, and other aspects, can include one or more of the following features. Machining and/or swaging an internal annular recess into the joint of casing can include machining and/or swaging the internal annular recess a longitudinal length that is less than a longitudinal length of the external male threads. Machining and/or swaging the internal annular recess can include choosing a longitudinal length of the annular recess based at least in part on a longitudinal length of a tool joint configured to be disposed inside the joint of casing disposed in a wellbore, the longitudinal length of the internal annular recess to be less than the longitudinal length of the tool joint. Machining the internal annular recess into the joint of casing can include machining the internal annular recess with a lathe. The joint of casing with the integral pin end can be a first joint of casing, and the method can include providing a second joint of casing having an integral box end with an internal female wedge thread configured to engage the external wedge thread disposed on the pin end of the first joint of casing.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

The FIGS. 1 and 6 are a schematic cross-sectional side view of an example wedge thread connection having an internal annular recess.

FIGS. 3 and 4 are flowcharts describing example methods for forming a wedge connection.

Like reference numbers and designations in the various drawings indicate like elements.

DETAILED DESCRIPTION

Figure 1:
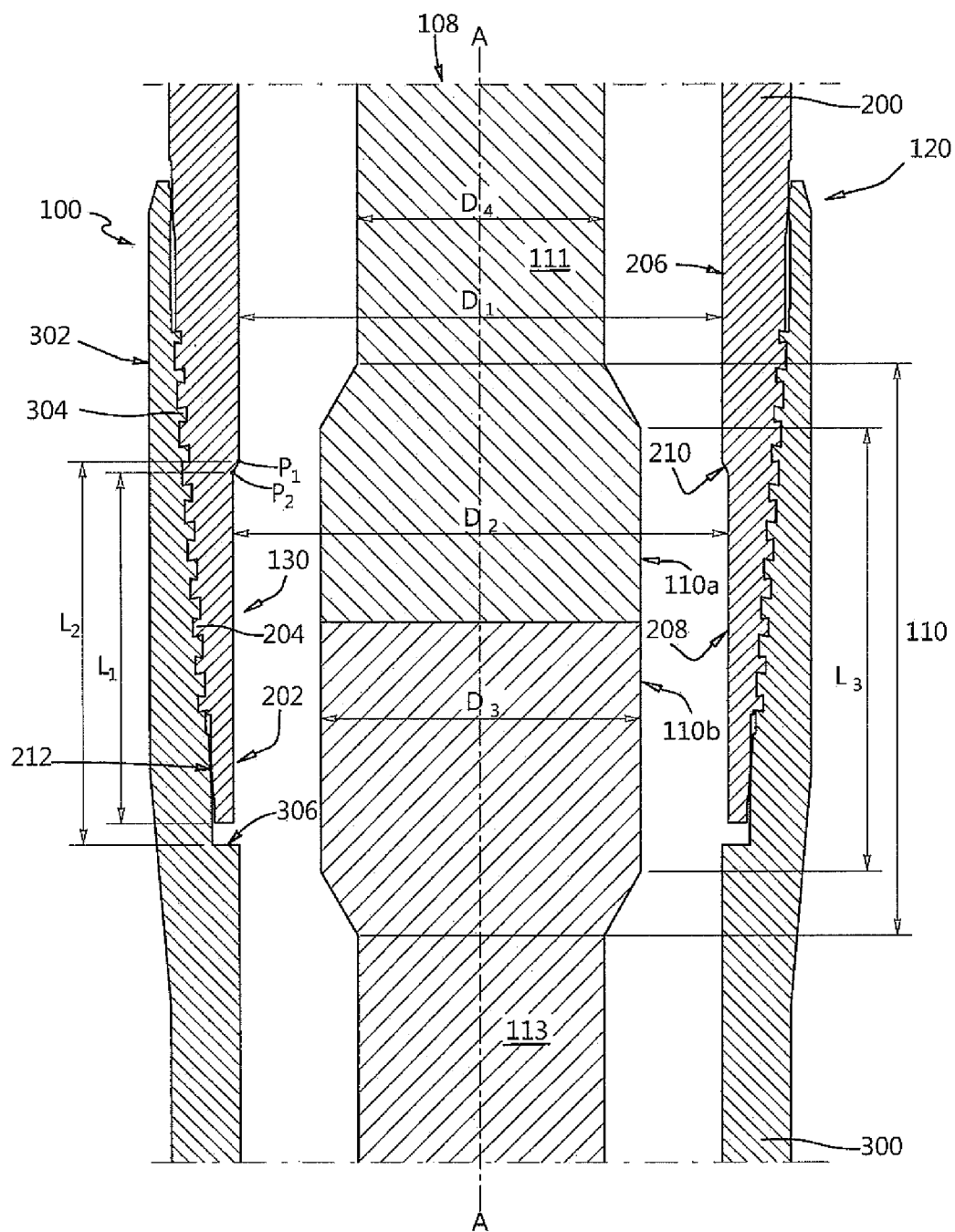

This disclosure describes a tubular connection, more specifically a wedge thread connection, with an internal recess, or counter-bore, along a part of a length of an internal portion of a pin-end of the connection. The recess of the threaded wedge connection provides advantages in spatial arrangement, spatial efficiency, and/or flexibility at the connection, while maintaining mechanical properties and sealing properties of the connection, for example, for its functional use in a wellbore casing.

Problems of Prior Art Wedge Connections

In some prior art wedge threaded connections, in order to accommodate a larger outer diameter (OD) tubing inside of a casing inner diameter (ID), it is common to radially increase the inside diameter ID of the casing to allow for extra clearance between the OD of the tubing and the inside of the casing. To maintain the structural integrity of the casing it has been a practice to increase the outside diameter (OD) of the casing. However, this increase may have negative consequences in smaller diameter wellbores, which are sometimes necessary in present drilling techniques for some wells. It is often not possible to user larger OD casings in these smaller diameter wellbores. In these situations, if the OD of the casing cannot be increased due to the diameter of the wellbore, and the ID of the casing is not increased because of concerns over the need for a certain wall thickness (amount of material) needed to carry the tensile load on the casing, the annular space between a coupling on production tubing string or workover tubing string and the tool joint on drill pipe and the inside diameter (ID) of the casing can be small, and there is potential for contact between the couplings of the tubing or the tool joint of a drill string and the inside of the casing. In some wells, such as deviated wells and long wells currently drilled for shale formations (e.g., vertical and horizontal segments), the torque needed to lower a drill string, production tubing, or workover string can cause the couplings of the tubing or tool joint of the drill string, which is often the largest OD from this pipe segment, to be twisted and brought into contact with the inside wall of the casing. This process may be repeated each time a new joint of tubing or drill pipe is lowered into the wellbore and through the casing (for example, in a well of 2,000 to 3,000 meters and pipe segments of approximately 10 to 12 meters). This repetitive procedure produces mechanical wear on the contacting parts among tubing coupling or drill pipe tool joint and the internal wall of the casing. This contact at wedge connections of the casing may mechanically wear on, or even sever and destroy, a wedge connection of a casing.

Advantages of the Annular Recess of the Present Disclosure

In the present disclosure, an internal area of the wedge connection has a recessed counter-bore adjacent to at least a portion of a threaded zone of the wedge connection, for example, to reduce excessive contact and mechanical wear on an inner surface of a casing tubing proximate to a wedge connection of the casing. The recess in a pin-end portion of a wedge connection described herein allows a tool joint or coupling to move inside a casing with much less chance to contact the inner diameter of a sealing zone of the wedge connection. Further, the recessed area of the wedge connection of the present disclosure provides the advantages of reduced mechanical wear on the wedge connection, maintaining of mechanical performance of the wedge connection (e.g., substantially equal mechanical performance compared to a wedge connection without a recess), and provides flexibility of the wedge connection in the metal-to-metal seal.

The annular recess of the present disclosure solves the problem of loss of sealing performance due to damage of the interior surface in the casing of the sealing area of the wedge connection caused by mechanical wear from the drill pipe tool joint or from mechanical wear of the coupling on a production or workover tubing string.

Additionally, the positioning of the annular recess provides flexure effect in the pin end in order to improve the metal-to-metal seal. The wedge connection with the recess is described in more detail later.

Certain terms are used herein as they would be conventionally understood in the tubular goods industry, particularly where threaded tubular goods are connected in a vertical position along their central axis such as when making up a tubular goods string for lowering into a wellbore. Typically, in a male-female threaded tubular goods connection, the male component of the connection is referred to as a "pin" member at a pin end and the female component is called a "box" member.

Figure 2A:
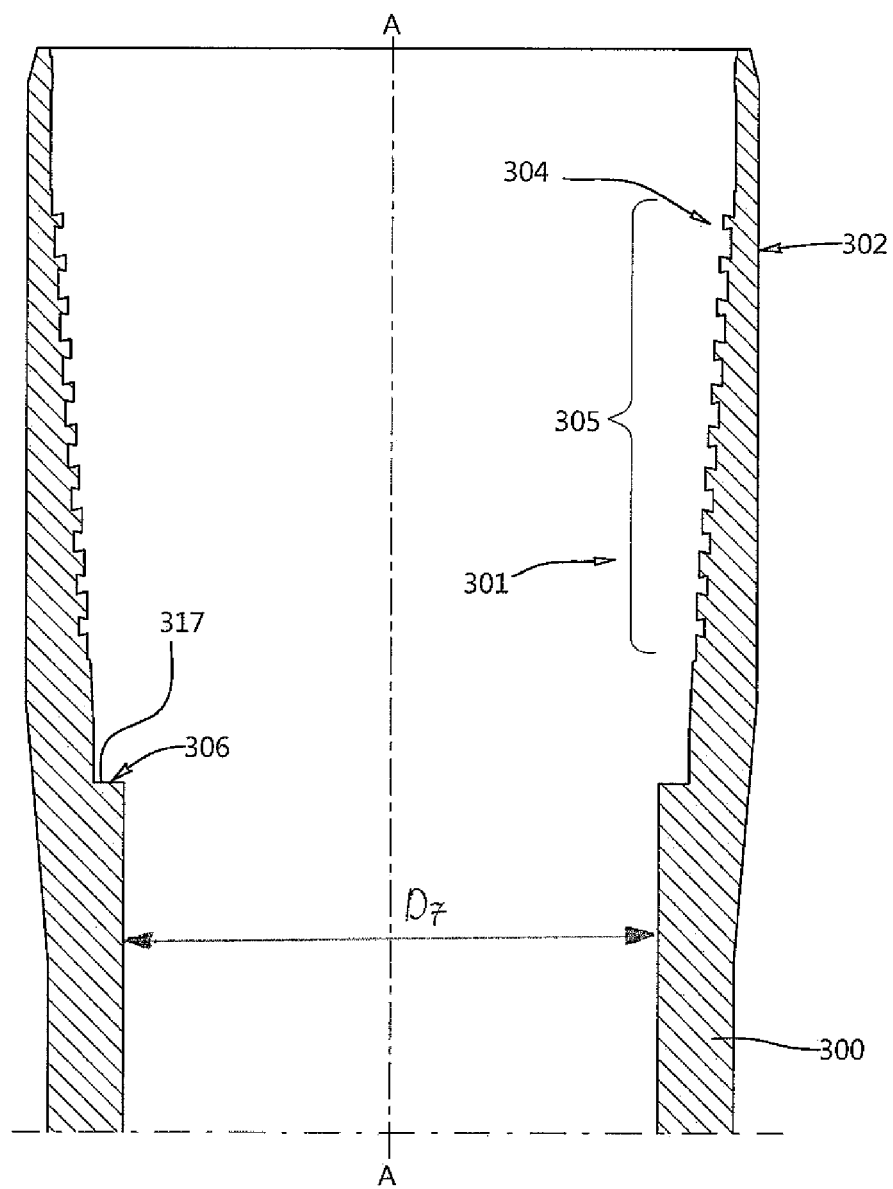
FIG. 2A is a schematic cross-sectional side view of an example tubular member with a box end.
Figure 2B:
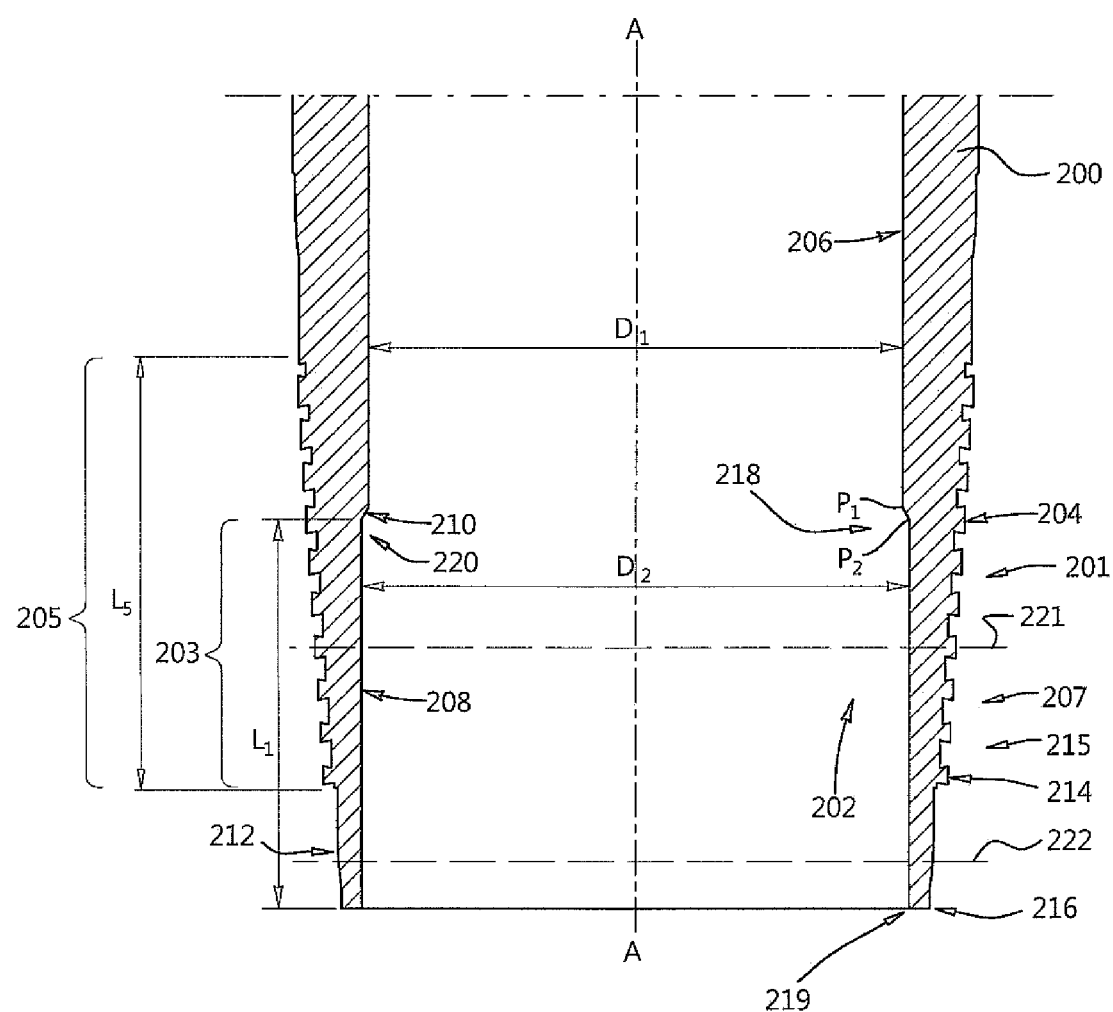
FIG. 2B is a schematic cross-sectional side view of an example tubular member with a pin end.
Figure 5:
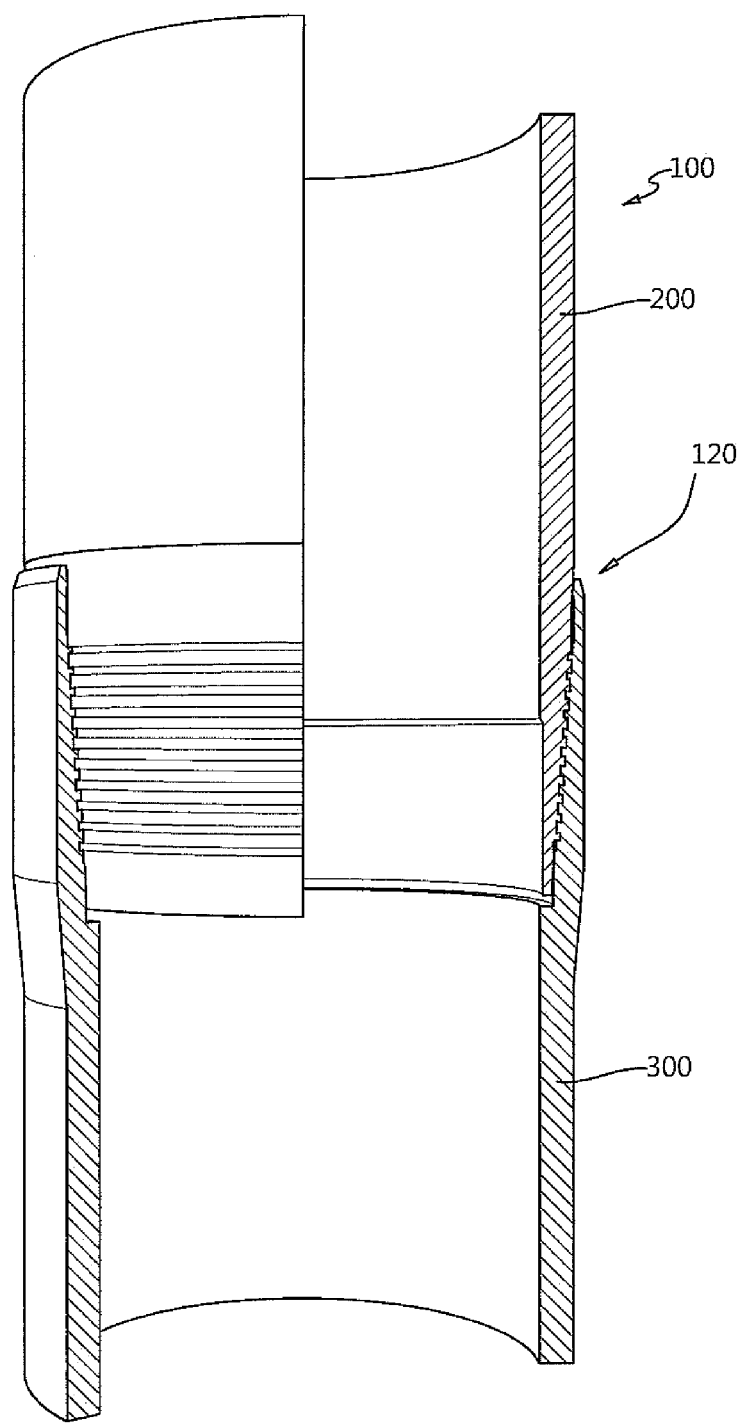
FIG. 5 is a partial cross-sectional perspective view of the example wedge thread connection of FIG. 1.

Referring now to FIG. 1, a tubular goods connection 100 is shown in a cross-sectional side view. A perspective view of the tubular goods connection 100 is also shown in partial cross-sectional perspective view in FIG. 5 The connection 100 includes a first (lower) tubular member 300 with a box end 302, and a second (upper) tubular member 200 with a pin end 202. The box end 302 of the first tubular member 300 is configured to engage with and seal to the pin end 202 of the second tubular member 200 to form the connection 100. In the example connection 100 of FIG. 1, the first tubular member 300 and second tubular member 200 form a portion of a casing configured for implementation in a wellbore. FIG. 2A is a cross-sectional side view of the first tubular member 300 of FIG. 1 shown separately. FIG. 2B is a cross-sectional side view of the second tubular member 200 of FIG. 1 shown separately.

The first tubular member 300 includes an integral box end 302 with an internal female wedge threaded zone 301 having an internal wedge thread 304 disposed along a box portion 305 of the box end 302. The second tubular member 200 includes an integral pin end 202 with an internal male wedge threaded zone 201 having an external wedge thread 204 disposed along a pin portion 203 of the pin end 202. When the pin of the second tubular member is inserted into the box of the first tubular member and the second tubular member is rotated, the external wedge thread 204 and the internal wedge thread 304 threadingly engage (e.g., corresponds to and mate) to form the tubular goods connection 100. This coupling of the first and second tubular members is referred to in the art as making-up the tubular goods connection. When the tubular goods connection 100 is made-up, the internal wedge thread will engage the external wedge thread via an interference fit of the mating wedge threads. In a preferred embodiment, the internal wedge thread sealingly engages the external wedge thread, for example, along all or a portion of the internal and/or external threaded zones.

As used herein, "make-up" or in the past tense "being made up" refers to the procedure of inserting into and engaging the pin end of the second tubular member with the box end of the first tubular member and screwing the members together through torque and rotation to obtain a "made-up connection". When the tubular goods connection 100 is made-up, the integral box end 302 and the integral pin end 202 are positioned at a final make-up position 120 relative to each other.

Additional information on wedge threads may be found in U.S. Pat. No. 5,338,074 issued to Barringer; U.S. Pat. No. RE 30,647 issued to Blose, and U.S. Pat. No. RE 34,467 issued to Reeves, each of which is incorporated herein by reference in their entirety.

Referring to the geometry of wedge threads, the term "load flank" designates the sidewall surface of a thread that faces away from the outer end of the respective pin or coupling member on which the thread is formed and supports the weight (i.e., tensile load) of the lower tubular member hanging in the wellbore. Similarly, the term "stab flank" designates the sidewall surface of the thread that faces toward the outer end of the respective pin or coupling member and supports forces compressing the joints toward each other such as the weight of the upper tubular member during the initial make-up of the joint or such as a force applied to push a lower tubular member against the bottom of a bore hole (i.e., compressive force).

Wedge threads, regardless of a particular type, increase in width W1, W2 in opposite directions on a pin member and a box member. In a preferred embodiment, the threads have a dovetail wedge thread profile characterized by having a width of a tooth crest WTC wider than a width of a teeth WTR, so it can also be said that both flanks, stab and load flanks, are negative. In some examples, the threads can take on other profiles and shapes.

Vanishing threads: The portion at the end of the threaded portion in a threaded connection, in which threads are not cut full depth, but which provides a transition between full formed threads and pipe body. Theoretically, the vanishing point is the point in which the tapered pitch diameter of the thread intersects the outside pipe diameter ("OD").

Additionally, a thread "lead" refers to the differential distance between components of a thread on consecutive threads. As such, the "stab lead" is the distance between stab flanks of consecutive thread pitches along the axial length of the connection. A "load lead" is the distance between load flanks of consecutive thread pitches along the axial length of the connection. A detailed discussion of wedge ratios is provided in U.S. Pat. No. 6,206,436 issued to Mallis, and is incorporated herein by reference in its entirety.

Wedge threads typically do not have torque shoulders, so their make-up is "indeterminate," and, as a result, the relative position of the pin member and box member may vary more during make-up for a given torque range to be applied than for connections having a positive-stop torque shoulder.

Depending on the type of the wedge thread (interference type or clearance type), the wedging between flanks will be generated in different ways. The wedging effect generated on interference wedge threads is due to specific axial interference fit between mating load and stab flanks. Moreover, the wedging effect can also be achieved without this specific design interference (e.g. clearance wedge type) by, for example, thread drunkenness and/or radial interference.

Regardless of the type of the wedge thread, e.g. clearance wedge, or interference wedge, corresponding flanks come closer to each other (i.e., clearance decreases or interference increases) during make-up. Indeterminate make-up allows for the flank interference to be increased by increasing the make-up torque on the connection. This increased make up torque will produce some drawbacks because said increased make up torque will generate a higher general stress state due to the higher flank to flank interference that will lead to high contact pressures between sliding elements (during make-up), and also between assembly elements (e.g., at the end of makeup).

Depending on the type of the wedge thread, the wedging between flanks will be generated in different ways. The wedging effect generated on interference wedge threads is due to specific interference fit between at least part of mating load and stab flanks of at least part of the threaded portion.

Sealing in a wedge thread is primarily obtained by a conical sealing surface located on the pin end between the terminal end 216 of the pin and the first thread. This surface engages a conical sealing surface on the box to provide a metal-to-metal seal at the lower end of the pin. The primary metal-to-metal surface profile can take a variety of forms. In some implementations, the metal-to-metal sealing surface is configured as a cone-sphere, sphere-sphere, another profile type, and/or other contact surfaces. Secondary sealing can be obtained by the interference effect of the wedge threads, for example, interference between all or a portion of the male wedge threads of the pin with all or a portion of the female wedge threads of the box.

As noted in U.S. Pat. No. 5,338,074, the disclosure of which is incorporated in its entirety by reference, flexibility in the pin nose section (lower portion) of a wedge thread is beneficial to prevent excessive metal to metal contact bearing stress, in particular without lengthening the geometry of the pin nose.

Referring still to the tubular goods connection 100 of FIGS. 1, 2A and 2B in one implementation, the first tubular member 300 is a first joint of casing 300 having the box end 302 and the internal female wedge thread 304 disposed longitudinally on a box portion 305 of the integral box end 302. The second tubular member 200 is a second joint of casing 200 having the integral pin end 202 with external male wedge threading 204 disposed longitudinally on a pin portion 205 of the integral pin end 202. The external male wedge thread 204 is configured to sealingly engage with the internal female wedge thread 304. The second joint of casing 200 has an internal diameter D1 of an inner surface 206 of the second joint of casing 200. The second joint of casing 200 also includes an internal annular recess 208 disposed longitudinally (when seen along the central longitudinal axis A-A) along the inner surface 206 of the second joint of casing 200. The internal annular recess 208 is positioned radially adjacent to a portion 203 of the external male threads 204, and forms an inner diameter D2 that is greater than the internal diameter D1 of the inner surface 206. For example, the internal annular recess 208 is radially aligned with a portion 203 of the external male threads 204 disposed closest to a longitudinal end of the pin end 202, shown in FIG. 1 as a lower longitudinal end of the pin end 202. A first virtual plane 221 extending perpendicular to the central longitudinal axis A-A of the second joint of casing 200 and through the part of the internal annular recess 208 being disposed radially adjacent to the portion 203 of the external male wedge threads 204 disposed on the lower portion 207 of the integral pin end 202 extends also through said portion 203 of the external male wedge threads 204.

The annular recess 208 has a longitudinal length L1, with respect to (e.g., parallel to) central longitudinal axis A-A. The length L1 of the annular recess 208 is less than a longitudinal length L5 of the male wedge thread 204 of the pin end 202. For example, the longitudinal length L1 of the annular recess 208 can be about half of the longitudinal length L5 of the external male wedge threads 204. In other examples, the length L1 can be a different length, but the length L1 is to be less than the longitudinal length L5 of the wedge threads 204. As shown in FIG. 1, the internal diameter D2 of the annular recess 208 is the same along the entire longitudinal length L1 of the annular recess 208. However, in some implementations, the internal diameter D2 can vary along the length L1 of the annular recess 208. For example, the internal diameter D2 of the annular recess 208 may gradually increase or gradually decrease from a first longitudinal end 218 of the recess 208 to a second, opposite longitudinal end 219 of the recess 208.

As shown in FIGS. 1 and 2B, the internal annular recess 208 is disposed radially adjacent to a portion of the external male wedge threads 204, while also adjacent to the unthreaded, metal-to-metal sealing surface portion 212 of the pin end 202 and box end 302. The internal annular recess extends from a first longitudinal end 218 to a second, opposite longitudinal end 219. In the shown example the second longitudinal end 219 is at the terminal end of the integral pin end. A second virtual plane 222 extending perpendicular to the central longitudinal axis A-A of the second joint of casing 200 and through the part of the internal annular recess 208 being disposed radially adjacent to the metal-to-metal sealing surface 212 of the integral pin end 202 extends also through said metal-to-metal sealing surface 212. The metal-to-metal sealing surface 212 can be the primary sealing zone of the wedge connection 100, and the portion of external male wedge threads 204 radially adjacent to the recess 208 can include a sealing portion of the threads. The sealing portion of the threads can form the secondary sealing zone of the wedge connection 100, and the recess 208 is aligned with the sealing portion of the external wedge threads 204. In the example tubing connection 100 of FIG. 1, the internal annular recess 208 and the sealing portion of the external wedge threads 204 are disposed near a longitudinal end portion of the pin end 202, such that the recess 208 is radially adjacent to a longitudinal end portion 215 of the external wedge threads 204. The annular recess 208 is adapted to provide flexibility to the longitudinal end portion (e.g., lower portion) of the pin end 202 of the second joint of casing 200, for example, when the first joint of casing 300 and second joint of casing 200 are made-up into the tubular connection 100. In some implementations, the annular recess 208 is adapted to provide flexibility required for sealing a lower end portion of the wedge threads 204 and 304 together to form the secondary seal, while also providing flexibility to the primary metal-to-metal sealing surface 212.

The second joint of casing 200 includes an internal transition section 210 disposed at a transition area between the annular recess 208 and the remainder of the inner surface 206 of the second joint of casing 200. For example, the transition section 210 is disposed at an upper longitudinal end 220 of the annular recess 208, where the transition section transitions the inner surface 206 of the second joint of casing 200 from the internal diameter D2 of the recess 208 to the internal diameter D1 of the rest of the second joint of casing 200. Referring to FIG. 1, point P1 is a first longitudinal end of the transition section 210, and point P2 is a second longitudinal end of the transition section 210, where point P1 is at a longitudinal location of the second joint of casing 200 that has diameter D1 and point P2 is at a longitudinal location of the second joint of casing 200 that has diameter D2. The transition section 210 can take a variety of shapes. For example, the transition section can include a linear profile between P1 and P2 or a non-linear profile between P1 and P2. In the example connection 100 of FIG. 1, the transition section 210 has a conical shape.

In some implementations, the first joint of casing 300 has an internal ledge 306 consisting of a terminal surface disposed substantially axially with respect to the central longitudinal axis. The terminal surface of the internal ledge 306 can extend substantially radially with respect to the central longitudinal axis. The terminal surface of the internal ledge 306 can extend substantially perpendicular with respect to the central longitudinal axis. The terminal surface of the internal ledge 306 can have another shape and orientation. The ledge 306 can form an end location of the box end 302. The ledge 306 forms an inset in the inner diameter D7 of the first joint of casing 300, and the female threading 304 can begin adjacent to the ledge 306 or a predetermined longitudinal distance from the ledge. In some implementations, the terminal end of pin 202 contacts the ledge 306 creating a positive stop torque shoulder. The inner diameter D7 of the first joint of casing 300 may be substantially the same as the internal diameter D1 of the second joint of casing 200.

Referring again to the second joint of casing 200, the annular recess 208 creates a recessed zone 130 of the connection 100 with an internal diameter D2 greater than an internal diameter D1 of the second joint of casing 200 and the internal diameter of the first joint of casing 300. This recessed zone 130 extends from the transition section 210 to the ledge 306 when the first joint of casing 300 is in sealing engagement with the second joint of casing 200, and has a longitudinal length L2 as shown in FIG. 1.

During drilling operations, a drill string 108 has a first (upper) joint of drill pipe 111 carrying a tool joint connection 110a and a second (lower) joint of drill pipe 113 carrying a tool joint 110b which is made-up into a tool joint connection 110. The drill string 108 and tool joint connection 110 can be selectively disposed within (e.g., radially inside of) the first casing 300 and second casing 200 and tubular connection 100. This drill string 108 and tool joint connection 110 may be used during drilling of a lower portion of a wellbore below a terminal end of a previously set string of casing including the first casing joint 300 and second casing joint 200 of casing. The tool joint connection 110 can include an outer diameter D3 that is greater than a diameter D4 of the drill string 108 at all or a portion of the entire longitudinal length of the tool joint connection 110, but is less than diameter D1 in order to fit within the tubular connection 100. The tool joint connection 110 also includes a longitudinal length L3, where L3 represents the length of the portion of the tool joint connection 110 with diameter D3. The longitudinal length L1 of the internal annular recess 208 is less than the longitudinal length L3 of the tool joint connection 110, and the length L2 of the recessed zone 130 is less than the length L3 of the tool joint connection 110, for example, so the tool joint cannot reside within the recessed zone 130 and contact the inner surface of the annular recess 208.

Figure 6:
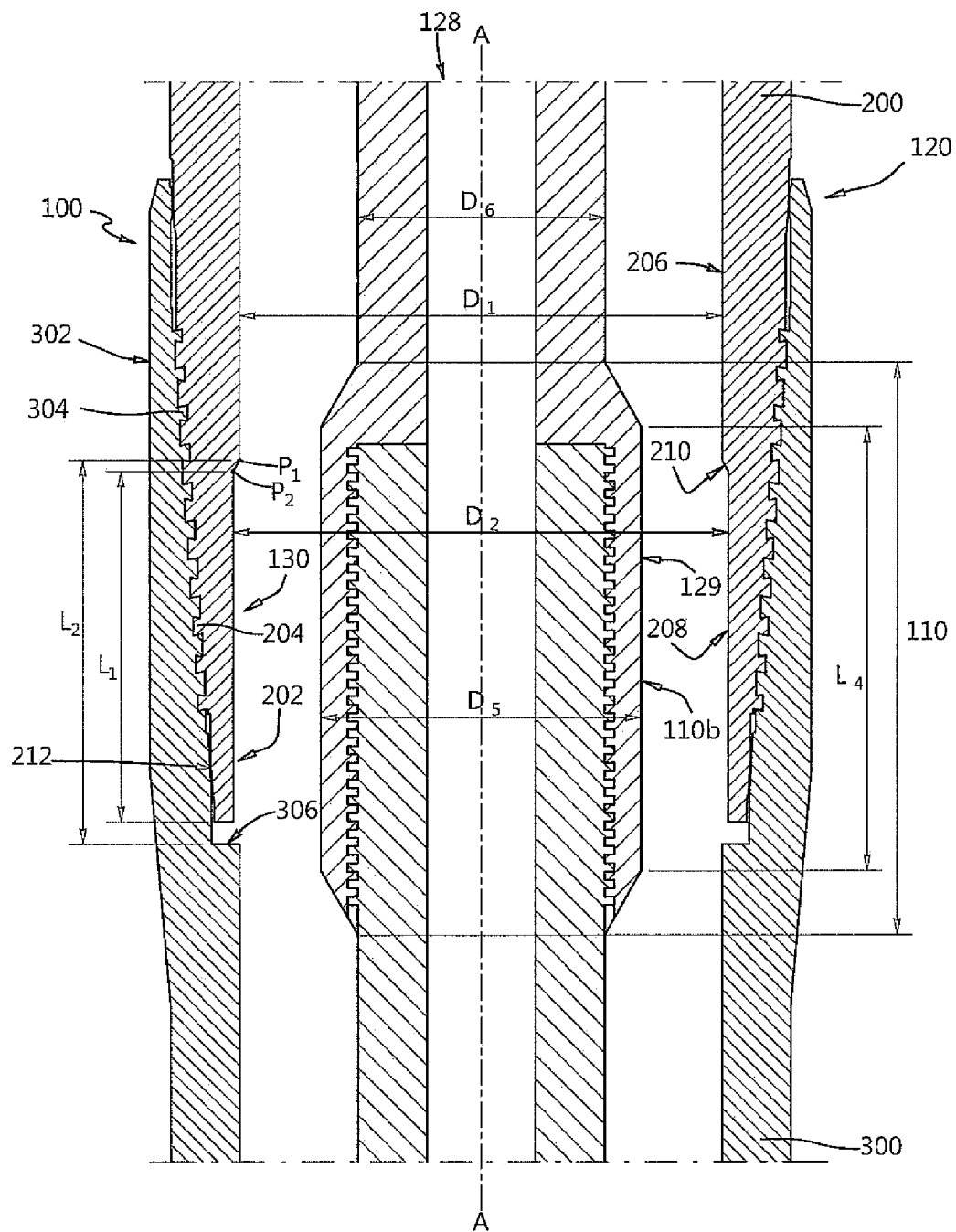

In some implementations instead of a drill string 108, a workover string of threaded and coupled tubing is selectively positioned inside the wellbore with one of the couplings on the workover tubing string inside the tubular connection 100. In other implementations instead of a drill string 108, a production string of threaded and coupled tubing is selectively positioned inside the wellbore with one of the couplings of the production tubing string inside the tubular connection 100. In these alternative implementations, which is schematically illustrated in FIG. 6, the longitudinal length L1 of the internal annular recess 208 is less than a longitudinal length L4 of a coupling 128 (having an outer diameter D5) on such a threaded and coupled tubing string 129 (having a smaller outer diameter D6) selectively disposed within the tubular connection 100.

It will be understood by one skilled in the art, that a production tubing string and or a workover tubing string may have integral connections instead of couplings. Such integral connections have an outer diameter that is larger than the outer diameter of the tubing and have a tapered external profile at the connection similar to the profile of the tool joint connection 110 of drill string 108 illustrated in FIG. 1. In such an implementation, instead of a drill string 108, a workover string or production tubing string is selectively positioned inside the wellbore with one of the integral connections inside the tubular connection 100.

As described earlier, the internal annular recess 208 is a recess, or counter-bore, in the pin end 202 of the second joint of casing 200. The length L1 of the recess 208 can vary, for example, based on the length L3 of the tool joint connection 110, based on a desired flexibility in the pin end 202, a combination of these parameters, or other factors. In some implementations, the length L1 of the recess 208 is selected to maintain proper functioning of a sealing zone of the connection 100, which can include the primary sealing surface 212 and the portion of the male threads 204 that engage with a portion of the female threads 304 proximate to a lower longitudinal end of the pin end 202, while also preventing egress of a well tool joint (e.g., tool joint connection 110 of drill string 108) into the recess 208. In implementations of a joint connection that does not include a recess 208 as described herein (e.g. where a pin-end of a joint of casing has an internal diameter that is the same throughout its length and is flush with upper and lower tubing sections), mechanical wear from a drill pipe tool joint or other tubing joints can damage the sealing area of the joint threading of the connection. However, in the example tubular goods connection 100 of FIG. 1, the annular recess 208 of the second joint of casing 200 provides an offset from the conventional internal diameter (e.g., D1) that decreases or avoids mechanical wear from the tool joint connection 110 coming into contact with areas of the pin end 202 adjacent to portions of the threading 204. Further, the annular recess 208 provides a degree of flexibility in the pin end 202 and thereby provides flexibility in the primary metal-to-metal sealing surface 212 and/or the secondary seal between the wedge threads 204 and 304, for example, to improve the metal-to-metal seal disposed between the first thread (e.g., lower most thread 214) and the terminal end 216 of the pin and/or improve the secondary seal at the interference of the thread 204 with thread 304.

To a person with ordinary skill in the art of wedge connections, it may appear counterintuitive to include an annular recess 208 in the pin end 202 of the second joint of casing 200 because it would seem more logical to have an inner diameter of a wedge connection that is consistent, linear, and flush, for example, so that wear of the inner surface of the wedge connection is distributed evenly along its inner surface length. Also, it may appear counterintuitive to insert an annular recess adjacent to a portion of the wedge threads and adjacent the metal-to-metal sealing surface 212 on the pin, which thereby reduces the wall thickness and reduces the amount of material needed to carry the burst load in the connection. Additionally, it may appear counterintuitive that reducing the material could actually enhance sealing in the lower portion of the wedge thread connection because it provides more flexibility, which reduces stress concentrations in the connection. However, as described herein, the annular recess 208 provides significant benefits in reducing wear on the sealing portion of the threaded wedge connection while maintaining mechanical properties, improving the seal of the wedge connection, and providing flexibility at the wedge connection that enhances sealing, among other advantages. For example, the mechanical properties are maintained because the recess is not along the portion of the threaded zone that is more significant to mechanical strength (e.g., a portion of the threaded zone at an upper longitudinal end of the threads 204 and threads 304). In other words, the recess 208 can be only along the portion of the threaded zone, such that there is no recessed area immediately or radially adjacent to the portion of the threaded zones that are more significant for mechanical strength.

FIG. 3 is a flowchart describing an example method 350 for forming a wedge connection, for example, such as the tubular goods connection 100 of FIG. 1. At 352, a joint of casing having an integral pin end with external male wedge thread positioned thereon is provided. The joint of casing has an internal diameter D1. At 354, an internal annular recess is formed (such as machined and/or swaged) into the joint of casing at the integral pin end, where the internal annular recess has an internal diameter D2 that is greater than D1. The annular recess is disposed longitudinally along an inner surface of the casing and radially adjacent to a portion of the external male threads disposed on a lower portion of the pin end. In some implementations, the internal annular recess is formed (such as machined and/or swaged) to have a longitudinal length that is less than a longitudinal length of the external male threads. In certain implementations, a longitudinal length of the annular recess is chosen based at least in part on a longitudinal length of a tool joint configured to be disposed inside the wedge connection disposed in a wellbore, where the longitudinal length of the internal annular recess is to be less the longitudinal length of the tool joint. In some examples, machining the internal annular recess into the joint of casing includes machining the internal annular recess with a lathe. In some instances, a second joint of casing having an integral box end with an internal female wedge thread can engage (e.g., sealingly engage) the external wedge thread disposed on the pin end of the first-mentioned joint of casing.

FIG. 4 is a flowchart describing an example method 400 for forming a wedge connection, for example, such as the tubular goods connection 100 of FIG. 1. At 402, a joint of casing is provided having an integral pin end, where the joint of casing has an internal diameter D1. At 404, an internal annular recess is formed (such as machined and/or swaged) longitudinally in an inner surface of the joint of casing at a predetermined position at the integral pin end. The internal annular recess has an internal diameter D2 that is greater than D1. At 406, external wedge threads are machined on an external surface of the integral pin end, where the annular recess is disposed longitudinally on the inner surface of the joint of casing and radially adjacent to a portion of the external male threads disposed on a lower portion of the pin end.

A number of implementations have been described. Nevertheless, it will be understood that various modifications may be made without departing from the spirit and scope of the disclosure.

The invention claimed is:

1. A tubular connection comprising:
a first joint of casing comprising an integral box end with an internal female threaded zone having internal female threads disposed on a box portion of the integral box end; and
a second joint of casing comprising a central longitudinal axis and an integral pin end with an external male threaded zone having external male threads disposed on a pin portion of the integral pin end, the external male threads configured to engage with the internal female threads such that the first joint of casing connects directly to the second joint of casing; and
a metal-to-metal sealing surface disposed between a lower most thread and a terminal end of the integral pin end;
wherein said second joint of casing has an internal diameter D1, said second joint of casing further comprising an internal annular recess having an internal diameter D2, wherein D2 is greater than D1, the internal annular recess disposed longitudinally along an inner surface of the second joint of casing, such that:
a virtual plane perpendicular to the central longitudinal axis intersects both the internal annular recess and the external male threads disposed on a lower portion of the integral pin end; and
the internal annular recess is not disposed longitudinally along an inner surface of the second joint of casing radially adjacent to the portion of the external male threads disposed on an upper portion of the integral pin end so as to maintain mechanical strength in the upper portion of the integral pin end on which the portion of the external male threads is disposed.

2. The tubular connection of claim 1, wherein the threads have a dovetail thread profile.

3. The tubular connection of claim 2, wherein the external male thread is configured to sealingly engage with the internal female thread.

4. The tubular connection of claim 1, wherein the internal annular recess is not disposed longitudinally along an inner surface of the second joint of casing radially adjacent to the portion of the external male threads disposed on an upper portion of the integral pin end.

5. The tubular connection of claim 1, wherein the tubular connection is configured for indeterminate make-up.

6. The tubular connection of claim 1, wherein the second joint of casing comprises an internal transition section disposed inside of the second joint of casing at an upper longitudinal end of the internal annular recess, and the internal transition section is configured to transition the internal diameter D2 of the internal annular recess to the internal diameter D1 of the second joint of casing.

7. The tubular connection of claim 1, wherein the internal diameter D2 of the internal annular recess is the same along an entire longitudinal length of the internal annular recess L1.

8. The tubular connection of claim 1, wherein the internal female threads and external male threads comprise wedge threads.

9. A method for forming a tubular, the method comprising:
providing a joint of casing having a central longitudinal axis and an integral pin end with an external male threaded zone having external male threads positioned thereon, the joint of casing having an internal diameter D1 and a metal-to-metal sealing surface disposed between a lower most thread and a terminal end of the integral pin end; and
forming an internal annular recess into the joint of casing at the integral pin end, the internal annular recess having an internal diameter D2 that is greater than D1, the internal diameter D2 being the same along a longitudinal length of the internal annular recess, and the internal annular recess disposed longitudinally along an inner surface of the joint of casing, such that:
a virtual plane perpendicular to the central longitudinal axis intersects both the internal annular recess and the external male threads disposed on a lower portion of the integral pin end; and
wherein forming the internal annular recess comprises choosing a longitudinal length of the internal annular recess such that the internal annular recess is not disposed longitudinally along an inner surface of the joint of casing radially adjacent to the portion of the external male threads disposed on an upper portion of the integral pin end so as to maintain mechanical strength in the upper portion of the integral pin end on which the portion of the external male threads is disposed.

10. The method of claim 9, wherein forming the internal annular recess into the joint of casing comprises forming the internal annular recess with a longitudinal length that is less than a longitudinal length of the external male threaded zone.

11. The method of claim 9, wherein forming the internal annular recess comprises choosing a longitudinal length of the internal annular recess based at least in part on a longitudinal length of a tool joint configured to be disposed inside the joint of casing disposed in a wellbore, the longitudinal length of the internal annular recess to be less than the longitudinal length of the tool joint.

12. The method of claim 9, wherein forming the internal annular recess comprises choosing a longitudinal length of the internal annular recess so as to provide flexibility in the lower portion of the integral pin end required to enhance sealing of the external male threads in the lower portion of the integral pin end.

13. The method of claim 9, wherein the forming of the internal annular recess comprises machining the internal annular recess into the joint of casing at the integral pin end.

14. The method of claim 13, wherein machining the internal annular recess into the joint of casing comprises machining the internal annular recess with a lathe.

15. The method of claim 9, wherein the forming of the internal annular recess comprises swaging the internal annular recess into the joint of casing at the integral pin end.

16. The method of claim 9, wherein the joint of casing with the integral pin end is a first joint of casing, the method further comprising providing a second joint of casing having an integral box end with an internal female threaded zone having internal female threads configured to engage the external male threads disposed on the integral pin end of the first joint of casing.

17. The method of claim 16, wherein the internal female threads and external male threads comprise wedge threads.

18. A tubular joint of casing, comprising:
a first joint of casing comprising a central longitudinal axis and an integral pin end with an external male threaded zone having external male threads disposed on a pin portion of the integral pin end and a metal-to-metal sealing surface disposed between a lower most thread and a terminal end of the integral pin end;
wherein said first joint of casing has an internal diameter D1, said first joint of casing further comprising an internal annular recess having an internal diameter D2, wherein D2 is greater than D1, the internal annular recess disposed longitudinally along an inner surface of the first joint of casing, such that:
a virtual plane perpendicular to the central longitudinal axis intersects both the internal annular recess and the external male threads disposed on a lower portion of the integral pin end, and the internal diameter D2 of the internal annular recess is the same along a longitudinal length of the internal annular recess L1; and
the internal annular recess is not disposed longitudinally along an inner surface of the first joint of casing radially adjacent to the portion of the external male threads disposed on an upper portion of the integral pin end so as to maintain mechanical strength in the upper portion of the integral pin end on which the portion of the external male threads is disposed; and
a second joint of casing comprising an integral box end with an internal female threaded zone having internal female threads disposed on a box portion of the integral box end, wherein the external male threads of the first joint of casing are configured to engage with the internal female threads of the second joint of casing.

19. The tubular joint of casing of claim 18, wherein the external male threads comprise wedge threads.

20. The tubular joint of casing of claim 18, wherein the internal female threads comprise wedge threads.

* * * * *